United States Patent [19]

Hattan

[11] 4,364,136

[45] Dec. 21, 1982

[54] FORMATION OF THREADED ELEMENTS HAVING A SELF-LOCKING ACTION

[75] Inventor: Mark Hattan, Orange, Calif.

[73] Assignee: William P. Green, Pasadena, Calif.; a part interest

[21] Appl. No.: 212,228

[22] Filed: Dec. 2, 1980

[51] Int. Cl.³ .............................................. B21D 53/24
[52] U.S. Cl. .................................. 10/86 A; 411/223; 411/307
[58] Field of Search ............. 10/86 R, 86 A; 411/222, 411/223, 242, 259, 307, 318, 383, 396, 432, 438

[56] References Cited

U.S. PATENT DOCUMENTS

| 770,945 | 9/1904 | Tuller | 411/223 |
|---|---|---|---|
| 2,328,706 | 9/1943 | Brackett | 411/223 |
| 3,938,209 | 2/1976 | Hattan | 10/86 A |
| 4,040,462 | 8/1977 | Hattan | 10/86 A X |

FOREIGN PATENT DOCUMENTS

158878 11/1921 United Kingdom ................ 411/223

Primary Examiner—Ervin M. Combs

Attorney, Agent, or Firm—William P. Green

[57] ABSTRACT

A fatigue resistant self-locking fastener is formed by screwing two threaded elements into engagement with a part having a thread which is slightly off-size with respect to the threads of those elements, locating the two elements just in contact with one another while in engagement with said part but without tightening them against one another sufficiently to develop any substantial stress in the threads, and then securing the elements together in that relative position, preferably by welding. Because of the off-size relationship of the locating part, the threads of the two elements when so located by the part are aligned axially with one another but are turned relative to one another about their common axis to positions in which the thread of one part is not precisely a true helical continuation of the thread of the other part, so that the two threads when subsequently screwed into engagement with a single coacting threaded element will have an interfering fit therewith attaining a self-locking action and improving resistance to fatigue and tensile failures.

9 Claims, 5 Drawing Figures

FORMATION OF THREADED ELEMENTS HAVING A SELF-LOCKING ACTION

BACKGROUND OF THE INVENTION

This invention relates to an improved method for manufacturing threaded fasteners.

In my prior application Ser. No. 111,774 filed Jan. 14, 1980 on "Fatigue Resistant Self-Locking Nuts and their Manufacture," now abandoned, I have disclosed a unique threaded fastener which in a single structure accomplishes the dual purposes of attaining a highly effective self-locking action resisting unscrewing retation of the fastener from a coacting threaded element, and also achieving a vastly improved distribution of load forces as compared with conventional fasteners in a manner enabling the overall fastener to withstand higher load forces without failure from either tensile or fatigue effects. Instead of the load forces being taken predominantly by the threads at the lower portion of the nut, that is, the turns which are closest to the load bearing face of the nut, the structure of the fastener is such as to shift a large part of the forces which would normally be localized in the bottom of the nut to an upper portion of the nut, with resultant distribution of those forces over essentially the entire axial extent of the nut. At the same time, the locking action produced by the fastener is more effective than that found in most prior self-locking nuts, and is of a character to retain the self-locking action through many cycles of connection and detachment of the threaded parts. Further, the fastener besides distributing the primary load forces more uniformly than in prior fasteners also distributes the self-locking forces more uniformly between the different turns of the threads.

The fastener of that prior invention includes a first body having a first preferably internal thread and a second body having a second preferably internal thread, with the two bodies and their carried threads being attached together in fixed axially aligned relative positions enabling the composite fastener assembly and both of its threads to be screwed into engagement with a single coacting threaded member. The two bodies are desirably secured together by fusion bonding, i.e. welding, brazing or soldering, electron beam welding being preferred in most instances where maximum strength is required. In the composite assembly, the two threads are turned slightly relative to one another about their common axis to positons in which neither is a true helical continuation of the other, so that they engage a coacting threaded member slightly differently and have an interfering fit therewith causing a self-locking action resisting unscrewing rotation of the composite fastener from the coacting member, and at the same time distributing axial load forces more uniformly among the different turns of the engaged threads.

SUMMARY OF THE INVENTION

The purpose of the present invention is to provide an improved method for forming a composite nut or other threaded fastener of the above discussed type, and particularly for relatively positioning the two nut sections for the welding or other attaching operation by screwing the sections into engagement with a locating part, preferably an externally threaded mandrel, but in a manner avoiding the development of any excessive stresses in the locating part or fastener sections which might resist unscrewing of the composite fastener from the locating part after welding. To achieve this result, I employ a locating part whose thread will screw into engagement with and mesh with the threads of the two sections, but which is dimensioned to allow slight axial movement of at least one and preferably both of the elements relative to the locating part. For example, a mandrel may have an external thread onto which two nut sections can be screwed, but with the mandrel threads being slightly undersize with respect to the nut threads to allow some axial play. When the two nuts or fastener sections are then screwed just into engagement with one another, the looseness in the threads will result in automatic precise locating of the thread of one section in a position turned slightly from a position of true helical alignment with the other thread. After welding of the sections together in this condition, the assembly can be easily unscrewed from the locating part, but when subsequently screwed into engagement with a normal thread of another part, will have the desired self-locking and load distributing characteristics with respect thereto.

BRIEF DESCRIPTION OF THE DRAWINGS

The above and other features and objects of the invention will be better understood from the following detailed description of the typical embodiment illustrated in the accompanying drawings, in which.

DESCRIPTION OF THE PREFERRED EMBODIMENTS

Figure 1:
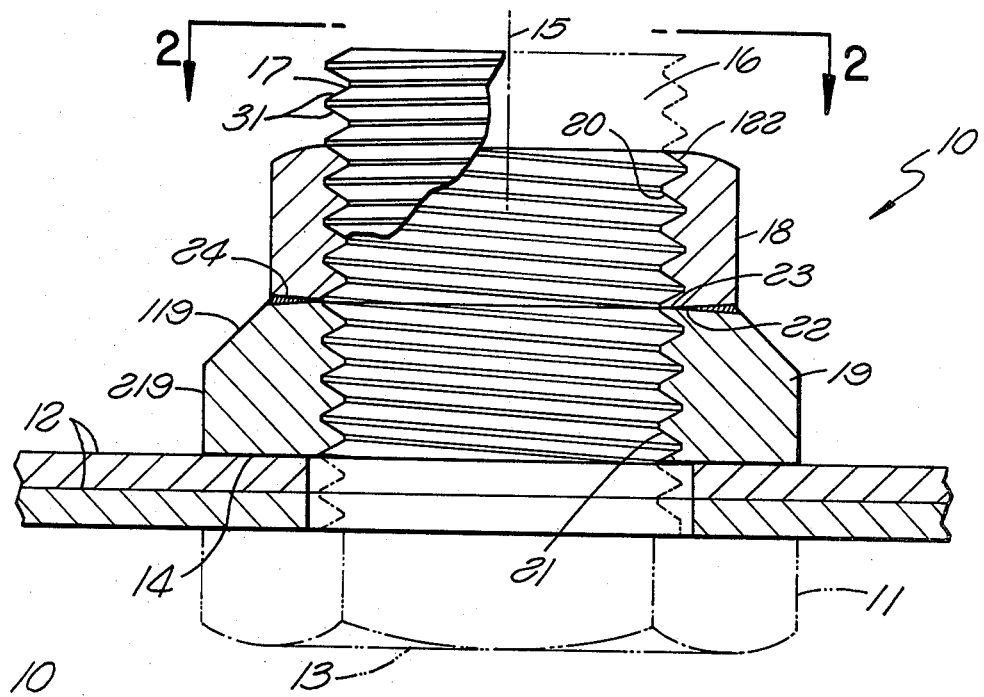
FIG. 1 is an axial section through a composite nut formed in accordance with the present invention.

In FIG. 1, there is represented at 10 a fatigue resistant self-locking nut of a type disclosed in my prior application Ser. No. 111,774, now abandoned, and which may be formed by the method of the present invention. The nut is typically illustrated as connected to a coacting screw or bolt 11, with plates 12 clamped between the enlarged diameter head 13 of the screw and an annular load-bearing face 14 formed at the inner or lower end of the nut and disposed transversely of axis 15 of the screw and nut. The shank 16 of the screw has external threads 17 of uniform diameter along the entire axial extent of the shank and typically illustrated as of standard 60° configuration as viewed in axial section. It will of course be understood that the particular overall assembly of parts shown in FIG. 1, including the plates 12 clamped between screw 11 and nut 10, is merely illustrative of one of the many environments in which a nut embodying the invention may be employed.

The composite nut 10 includes two initially separately formed nut bodies 18 and 19 having internal threads 20 and 21 respectively which may be identical with one another and are of uniform diameter, and have a thread profile and diameter corresponding to and adapted to engage the external threads 17 on screw 11. Bodies 18 and 19 are essentially rigid, and in most instances are formed of metal, such as steel, but are adapted to be deformed very slightly when tightened against a work piece such as plates 12, and to resiliently resist such deformation in a manner developing internal stresses within the material of the nut bodies which act to return those bodies by the resilience of the material of which they are formed to their initial condition when the load forces are released. The two bodies 18 and 19 are initially formed with transverse end faces 22 and 23 disposed perpendicular to axis 15 and adapted to abut annularly against one another to transmit axial forces between bodies 18 and 19. The bodies are rigidly secured in fixed relative positions, desirably by fushion bonding them together annularly at 24, preferably entirely about axis 15 and at the locations of the two abutting surfaces 22 and 23. In some instances, it is contemplated that other means of attachment of the two bodies rigidly together may be utilized. The preferred method of attachment is by electron beam welding, as represented diagrammatically in FIG. 4, in which 25 represents an electron beam gun disposed perpendicular to the axis 15 of nut 10 and aimed radially inwardly at the location of abutting surfaces 22 and 23, to form the annular weld 24 between bodies 18 and 19 as those bodies are turned about axis 15 relative to the gun 25. This relative rotation may be effected either by maintaining the electron beam gun 25 stationary and rotating the nuts, or vice versa by maintaining the nut bodies stationary and moving the electron beam gun 25 circularly about axis 15. The result is to fuse the material of bodies 18 and 19 together, annularly about axis 15, and radially inwardly from their peripheries at the locations of surfaces 22 and 23 far enough to attain the desired rigid connection between the two nut bodies.

Externally, the upper or outer nut body 18 may be noncircular to be engaged and turned by a wrench, while the lower body 19 may be externally circular and desirably larger in diameter than body 18 for most effective transmission of axial load forces to plates 12. The outer surface of body 19 may flare frustoconically at 119 to an enlarged diameter, and then extend cylindrically at 219. In most instances, body 18 should be externally either hexagonal as illustrated in FIG. 2, or of 12 point wrench-engaging configuration.

Figure 2:
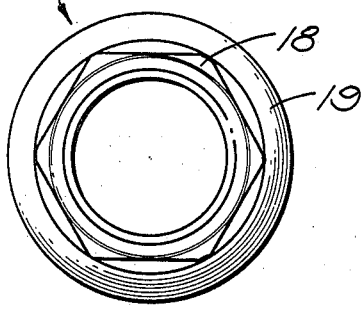
FIG. 2 is a reduced plan view taken on line 2—2 of FIG. 1.
Figure 3:
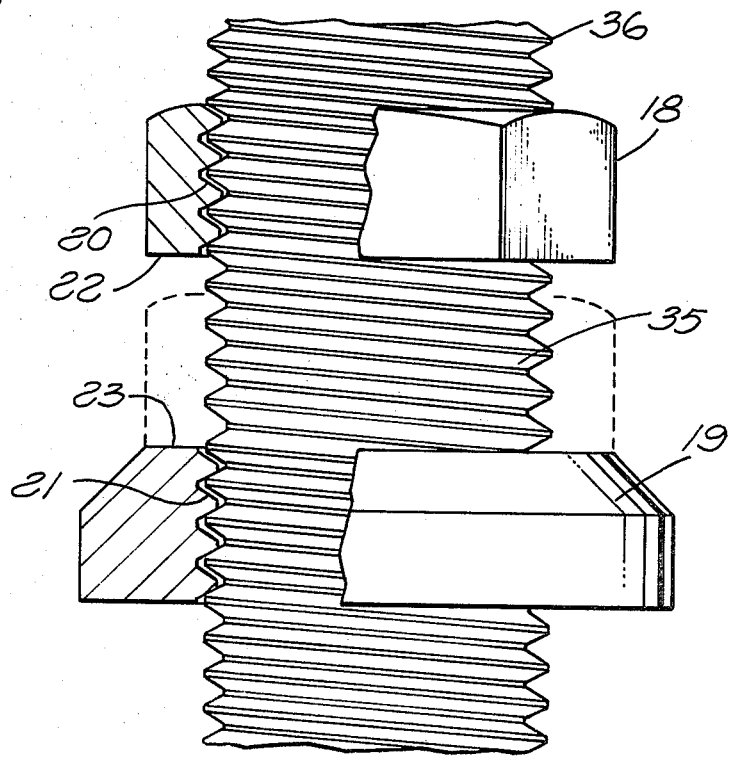
FIGS. 3 and 4 are axial sectional views, partially in elevation, showing two steps in the present manufacturing process.

In the arrangement of FIGS. 1 to 3, the internal threads 20 and 21 in nut bodies 18 and 19 are identical and are formed integrally with those bodies, as by initially forming bodies 18 and 19 in unthreaded form and then tapping or otherwise machining threads in their interior. It is contemplated broadly that the threads 20 and 21 and the engaging external threads 17 on screw 11 may be of any desired thread profile, but in most instances standard 60° threads are utilized. The drawings typically illustrate such standard threads. The two nut bodies 18 and 19 are preferably of identical axial extent, with that axial extent desirably being such that each of the internal threads 20 and 21 has several turns between its upper and lower ends (say three or four turns). The standard threads, as viewed in axial section, have opposite side faces 28 (see FIG. 5) disposed at a 60° angle to one another and have directly axially extending minor diameter peak portions 29 and directly axially extending major diameter surfaces 30. The pitch of the threads in each of the nuts 18 and 19 is uniform for the entire axial extent of that body. More specifically, considering the upper nut body 18, the pitch distance a between the centers of successive turns of thread 20 in that body is uniform from the location of bottom surface 22 of the nut body to the upper surface 122 of that body. Similarly, the pitch distance axially between the centers of successive turns of lower nut 19, as viewed in axial section, is uniform from the bottom face 14 of nut 19 to its upper end surface 23, and is equal to the pitch distance a of upper body 18. The external thread 17 of screw 11 has an axial section essentially the same as that of the nut threads, with the opposite side faces 31 (see FIG. 1) of the screw threads being disposed at a 60° angle to engage and apply force axially to faces 28 of the nut threads 20 and 21.

Figure 5:
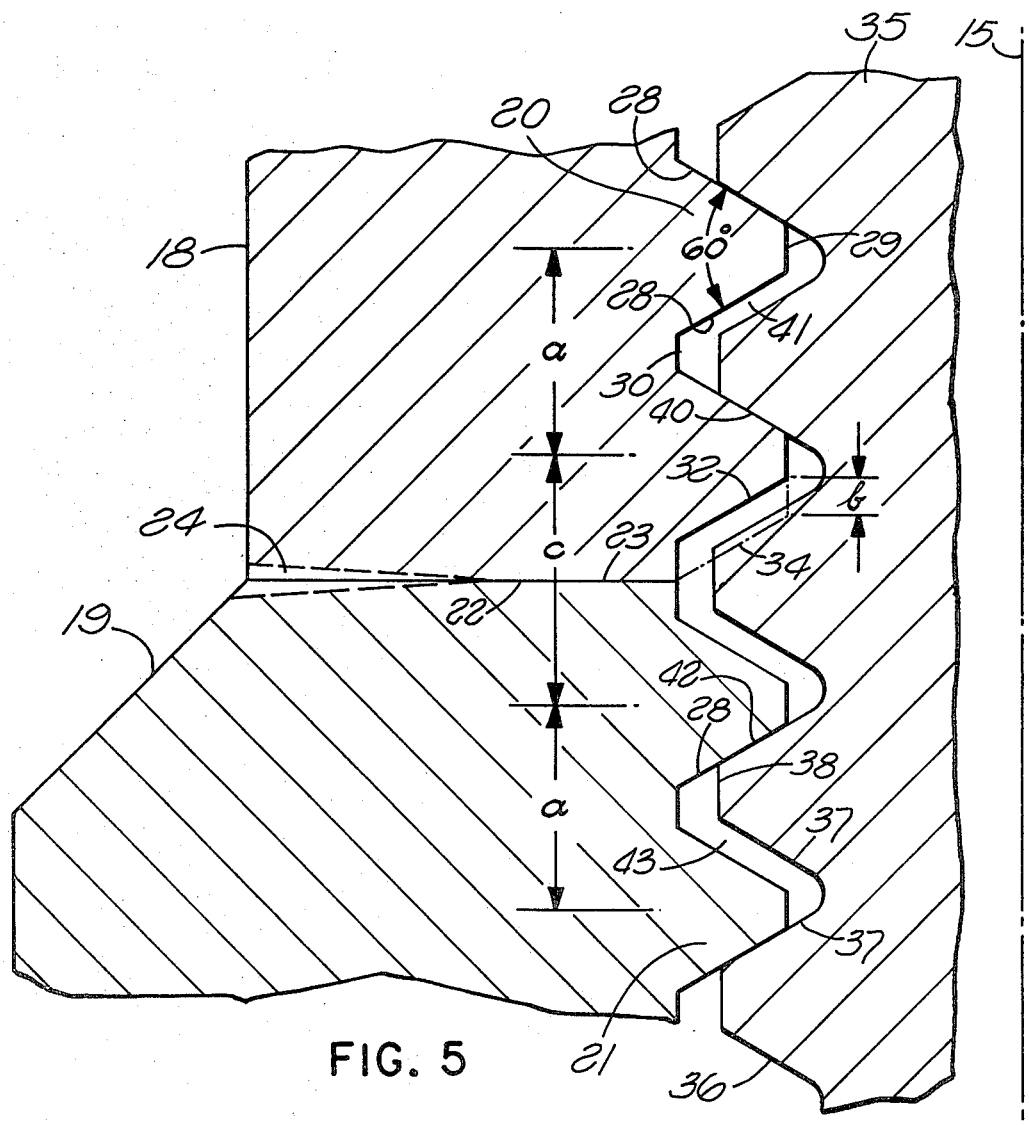
FIG. 5 is a greatly enlarged framentary axial section corresponding to a portion of FIG. 4.

The two nut bodies 18 and 19 and their internal threads 20 and 21 are aligned with one another axially, both being centered about the common axis 15. In order to introduce a self-locking and load distributing effect into the composite nut 10, the two nut bodies 18 and 19 are secured together by weld 24 in relative positions in which internal threads 20 and 21 have an interfering fit with thread 17 of screw 11. Stated differently, it may be considered that upper body 18 before attachment to lower body 19 is turned relative to lower body 19 about axis 15 through a slight angle, preferably between about 10 and 60 degrees, so that the upper thread 20 is then not a true helical continuation of lower thread 21, and therefore does not engage the thread of screw 11 in exactly the same manner as does thread 21. Referring to FIG. 5, which is an axial section through portions of the two threads 20 and 21, in a plane containing central vertical axis 15 of the composite nut, and with threads 20 and 21 in the relative positions in which they are welded together, it is noted that as viewed in axial section, each of the individual turns 32 of thread 20 is in effect shifted upwardly a short distance b from the position which it would assume (position represented in broken lines at 34) if body 18 were in a rotary position in which its thread was located to be a true helical continuation of the internal thread of body 19. The result is that, still considering the two connected nut bodies as viewed in axial section (FIG. 5), the effective pitch distance c between the uppermost turn of lower nut body 19 and the lowermost turn of upper nut body 18 is slightly greater than the pitch distance a between successive turns of nut 18 and between successive turns of nut 19, the difference between the pitch distances a and c of FIG. 5 being the previously mentioned dimension b through which the thread of nut 18 as viewed in axial section appears to be shifted upwardly relative to the thread of nut 19 as a result of the relative rotation of the two parts before securing them together. This axial offsetting of the two threads, which may be somewhat exagerated in FIG. 5 for illustrative purposes, is just sufficient to attain a predetermined self-locking torque and load distributing effect in the overall composite nut 10.

Figure 4:
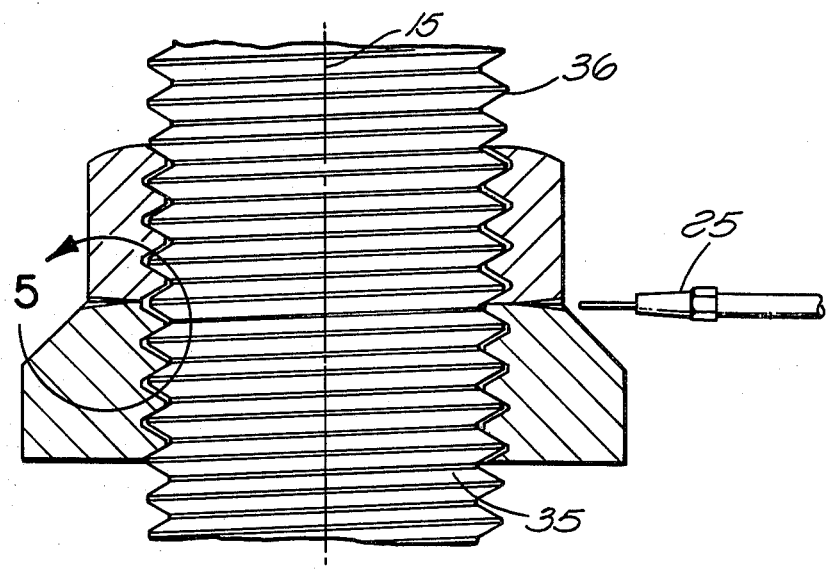

The present invention is concerned with an improved method of manufacturing the composite nut 19 thus far described, and particularly with the manner in which the two nut bodies are precisely located relative to one another for the welding or other connecting operation in a relation assuring exactly a predetermined degree of interference between the nut and screw threads. In accordance with that method, the two nut bodies 18 and 19 are first separately preformed with internal threads as discussed, following which they are both screwed onto a single mandrel 35 having an external thread 36. The two nuts are turned relative to one another on the mandrel to positions in which they just touch one another and may have slight frictional contact but preferably do not develop any substantial axial stresses in the mandrel or nut bodies (see broken line position of nut 18 relative to nut 19 in FIG. 3). The mandrel is so formed that when the nut bodies are thus just in contact with one another, the nuts are automatically located in the relative rotary positions of FIGS. 1 to 3, in which their threads are not precisely true helical continuations of one another but are turned through a small angle, preferably between about 10 and 60 degrees, from positions in which one would be a true helical continuation of the other. The nut bodies are then annularly welded together in that relative position as represented in FIG. 4, either by rotating the electron beam gun 25 about mandrel 35, and the carried nut bodies and their axis 15, or by rotating the mandrel and nuts while maintaining the electron beam gun stationary. The mandrel is preferably formed of copper to effectively conduct heat away from the nut threads during the welding operation and prevent any adverse effect on those threads by the heating. After the welding has been completed, the composite nut assembly can be easily unscrewed from the mandrel since the nut bodies have not been tightened against one another to an extent developing any substantial interference with respect to the specially formed mandrel thread.

The mandrel thread 36 is given its capacity for properly locating the two nut bodies without tightening them together to an extent developing as much interference with the mandrel as is ultimately desired between the composite nut and screw 16, by forming the thread 36 of the mandrel to be slightly undersize as compared with the nut threads 20 and 21. As seen in FIG. 5, thread 36 may have an axial sectional profile essentially the same as that of internal threads 20 and 21 of the nut bodies, with the opposite side faces 37 of each turn of thread 36 being disposed at a 60 degree angle to one another, but with those faces and the major and minor diameter portions 38 and 39 of thread 36 all being at diameters slightly less than the corresponding side faces 28 and major and minor diameter surfaces 30 and 29 of the nut threads. As a result, the thread of each nut body does not interfit closely with the mandrel thread, and permits slight axial movement of the nut relative to the mandrel when the nuts are not engaged with one another. When the nuts are turned to positions of contact with one another, however, as in FIGS. 4 and 5, and the play between the mandrel and nuts is taken up and the mandrel thread engages against the thread of nut 18 in one axial direction and against the thread of nut 19 in the opposite axial direction in a manner urging the nuts toward one another and holding their faces 22 and 23 in contact. More specifically, the mandrel thread engages thread 20 of nut body 18 at 40 and is spaced therefrom at the opposite side 41, to exert downward force against nut 18 while the mandrel thread engages thread 21 of nut 19 at 42 and is spaced therefrom at 43 to exert upward force against nut 19. In this condition, the upper thread is not exactly a true helical continuation of the lower thread but is turned through the desired angle from such a position of true helical alignment, so that when the nut bodies are welded together their threads will be in the relative position of FIG. 5.

After the composite nut 10 has been removed from the mandrel, the nut can be screwed onto a bolt or stud as represented at 11, and will have an enhanced self-locking and load distributing action with respect thereto. As the lower nut 19 is first advanced onto screw 11, the various turns of thread 21 of course mate exactly with the external thread 17 of the screw, and can be turned onto the screw with little or not frictional resistance. When the lower turn of thread 20 reaches a point of contact with thread 17 of the screw, however, that thread 20 does not move as easily into engagement with the thread of the screw, but rather has an interfering fit therewith requiring slight deformation of the nut and/or screw threads in order to advance the nut farther onto the screw. Considering again FIG. 5, as the portion of the lower turn of thread 20 in body 18 which is illustrated in that figure reaches a point of contact with the external thread of the screw, that thread of the screw exerts force downwardly against the lower turn of the thread in body 18 to pull that turn downwardly closer to a position of true helical alignment with the thread of lower body 19. At the same time, upward forces are exerted on the thread of lower body 19, thus slightly resiliently deforming the threads of both bodies, and opposing forces are exerted on the thread of the screw to slightly resiliently lengthen the screw axially. As the rest of the turns of upper body 18 advance onto the screw, similar forces are exerted against those turns, with the result that the internal stresses developed in the nut and screw as they are slightly resiliently deformed maintain the engaged threads of the nut and screw in tight frictional engagement resisting unscrewing rotation of the nut from the screw and thereby attaining a self-locking action having a torque of predeterminable value dependent upon the extent to which bodies 18 and 19 were turned relative to one another before they were welded together. This self-locking action is not destroyed by application of the nut to a screw, but rather will repeat reliably for many uses of the nut.

When the composite nut 10 of FIG. 1 is tightened downwardly against work pieces 12, the above discussed relative orientation of the threads of nut bodies 18 and 19 causes the axial load forces, and the self-locking forces, to be distributed more effectively over the different turns of the nut thread than if a nut of uniform pitch were utilized. Whereas in a conventional nut most of the load forces are taken by the lowermost turns, and failure therefore occurs at that location, the relative rotary orientation of threads 20 and 21 in FIG. 1 has the effect of shifting much of the load which would normally be taken by the lower turns of the nut to the upper thread 20 in nut body 18. This enables both the nut and screw threads to take a greater overall tensile load without damage to either, and also greatly increases their resistance to fatigue load failure under repetitive or fluctuating stress and strain conditions.

While a certain specific embodiment of the present invention has been disclosed as typical, the invention is of course not limited to this particular form, but rather is applicable broadly to all such variations as fall within the scope of the appended claims. For example, though the invention has been described as applied to composite nuts having two sections welded together, it will be understood that the method of the invention may also be used for welding or otherwise securing together three or more nut bodies to form a multi-section nut. In addition, it is contemplated that one or more of the individual nuts may be of a type having a thread which is initially formed separately from the body of the nut, as a coiled element inserted into and welded within the body, as for instance in accordance with the teachings of my prior U.S. Pat. Nos. 4,040,462 and 3,938,209.

I claim:
1. The method of forming a fastener that comprises:
positioning two elements having similar internal threads on an external thread which is dimensioned to fit said internal threads loosely, in a relation allowing each of said elements if engaged individually with the external thread to shift axially relative thereto through a substantial distance without relative rotation or deformation of the engaged threads;

locating said two elements on said external thread in predetermined relative positions in which they are turned so that their internal threads are not true helical continuations of one another, and in which said two elements limit axial and rotary movement of one another and their threads bear in opposite axial directions against the external thread to eliminate looseness between the threads;

attaching said two elements together while in said predetermined relative positions on said external thread; and removing the two attached elements from said external thread as a composite integrated unit adapted to have an interfering fit with a threaded part of predetermined size.

2. The method as recited in claim 1, in which said internal threads of said two elements, in said predetermined relative positions in which they are attached together, bear against said external thread only lightly without developing any substantial axial stresses in said elements or said external thread so that after said two elements have been attached together they can be unscrewed easily from the external thread even though said internal threads are turned to nonhelically aligned positions.

3. The method as recited in claim 2, in which said attachment of said elements together in said predetermined relative positions is effected by electron beam welding the elements together essially peripherally and essentially annularly.

4. The method as recited in claim 3, in which said external thread is of a diameter substantially less than said internal threads to allow said axial looseness between the internal and external threads.

5. The method as recited in claim 4, including screwing said composite internally threaded unit, after removal from said external thread, onto another external thread which is dimensioned to have a closer fit than said first mentioned external thread with each of said internal threads individually and to therefore have a binding interfering contact with said unit.

6. The method as recited in claim 1, in which the attachment of said two elements together is effected by fusion bonding the elements together.

7. The method as recited in claim 1, in which said external thread is of a diameter substantially less than said internal threads to allow said axial looseness between the internal and external threads.

8. The method as recited in claim 1, including screwing said composite internally threaded unit, after removal from said external thread, onto another external thread which is dimensioned to have a closer fit than said first mentioned external thread with each of said internal threads individually and to therefore have a binding interfering contact with said unit.

9. The method of forming a fastener that comprises:

positioning two elements having similar internal threads on an externally threaded part which is dimensioned to fit at least one of said internal threads loosely, in a relation allowing said one internal thread if engaged individually with the externally threaded part to shift axially relative thereto through a substantial distance without relative rotation or deformation of the engaged threads;

locating said two elements on said externally threaded part in predetermined relative positions in which they are turned so that their internal threads are not true helical continuations of one another, and in which said two elements limit axial and rotary movement of one another and their threads bear in opposite axial directions against the external thread to eliminate looseness between the threads;

attaching said two elements together while in said predetermined relative positions on said externally threaded part; and removing the two attached elements from said externally threaded part as a composite integrated unit adapted to have an interfering fit with a threaded part of predetermined size.

* * * * *